July 21, 1953   R. L. JENKINS   2,646,403
HALOGENATED AROMATIC HYDROCARBON DIELECTRIC CONTAINING
DIPHENYL TIN DIETHYLATE AS A SCAVENGER
Filed Dec. 27, 1948

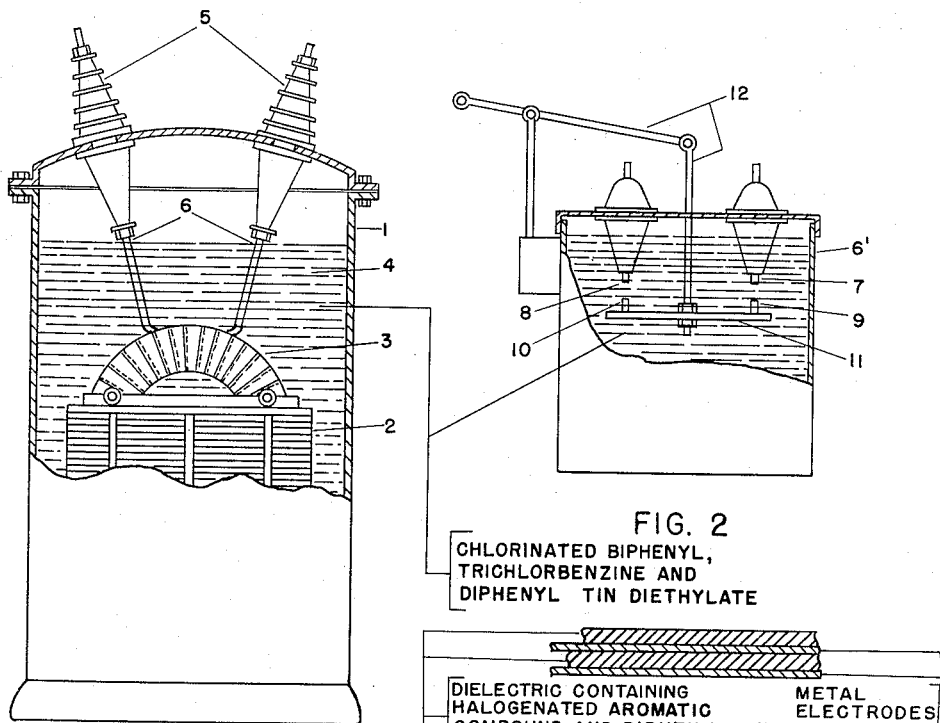

FIG. 1

FIG. 2

[CHLORINATED BIPHENYL, TRICHLORBENZINE AND DIPHENYL TIN DIETHYLATE]

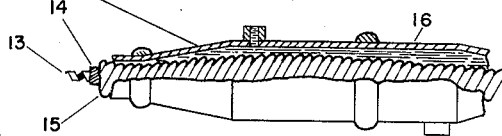

[DIELECTRIC CONTAINING HALOGENATED AROMATIC COMPOUND AND DIPHENYL TIN DIETHYLATE]   METAL ELECTRODES

FIG. 4

FIG. 5

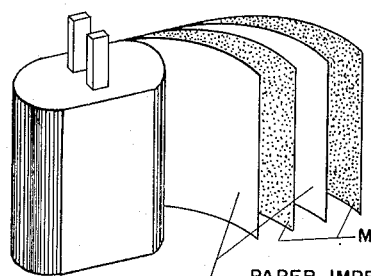

METAL FOIL

PAPER IMPREGNATED WITH HALOGENATED AROMATIC COMPOUND AND DIPHENYL TIN DIETHYLATE

FIG. 3

Russell L. Jenkins
*INVENTOR.*

BY *Elmer P. Rucker*

ATTORNEY

Patented July 21, 1953

2,646,403

UNITED STATES PATENT OFFICE 2,646,403

HALOGENATED AROMATIC HYDROCARBON DIELECTRIC CONTAINING DIPHENYL TIN DIETHYLATE AS A SCAVENGER

Russell L. Jenkins, Anniston, Ala., assignor to Monsanto Chemical Company, St. Louis, Mo., a corporation of Delaware Application December 27, 1948, Serial No. 67,388

11 Claims. (Cl. 252—63.5)

The present invention relates to novel compositions of matter comprising halogenated organic compounds and diphenyl tin diethylate as a scavenging or corrosion inhibiting material. More specifically, the invention relates to apparatus, particularly electrical apparatus such as capacitors, transformers, circuit breakers, cables and the like containing the above compositions.

Halogenated organic compounds, more particularly halogenated aromatic compounds such as chlorinated biphenyl and chlorinated naphthalene are highly useful electrical insulating materials because of their high dielectric constants, thermal stability, resistance to oxidation, nonflammability and other valuable properties. However, it has been found that when exposed to elevated temperatures and/or high voltages, they partially decompose liberating hydrogen halides which have an exceedingly deleterious action on the paper insulation and metal parts of electrical apparatus.

For example, in transformers, circuit breakers and other electrical devices in which arcing occurs, the development of hydrogen halides as a result of the above decomposition presents a serious problem as they decrease the dielectric strength of the composition containing same and cause considerable damage by attacking paper insulation and corroding metal parts of the apparatus in which the composition is used. The undesirable effect of the above decomposition is further manifested when the above halogenated organic compounds are used as capacitor impregnants. Thus, under high operating temperatures and direct current voltages, capacitors impregnated therewith undergo a characteristic type of deterioration which results in an ever increasing leakage current, a short capacitor life, visible localized decomposition of the dielectric and corrosion of the electrodes. Moreover, in the case of capacitors operating on alternating current, the decomposition sometimes results in an excessive increase in power factor of the dielectric material.

It is, therefore, the object of the present invention to provide new compositions of matter containing halogenated organic compounds wherein the above objectionable properties are either completely eliminated or substantially reduced.

An additional object is to provide transformers, capacitors, circuit breakers, cables and the like containing halogenated organic compounds in combination with a corrosion inhibitor or scavenger whereby the deleterious action of hydrogen halides on the paper insulation and metal parts thereof is eliminated or materially reduced.

Another object is to provide a capacitor impregnant containing halogenated organic compounds and a corrosion inhibitor or scavenger, whereby the deleterious effect of hydrogen halides on the electrodes and paper insulation of capacitors is substantially reduced or completely eliminated with the result that the capacitor has a longer useful life and greater dielectric stability than similar capacitors not containing the corrosion inhibitor.

A further object is to provide the cellulosic insulation in transformers containing liquid halogenated organic compounds with protection against rapid destruction by hydrogen halides evolved as the result of a minor arc within the transformer, thus permitting complete repair of the assembly by rapid replacement or removal of the particular part that gave rise to the arc and thereby avoiding destruction of the entire paper insulation of the transformer with a consequent high cost of repair.

A still further object is to provide switches, cables and the like containing halogenated organic compounds and a corrosion inhibitor or scavenger which practically eliminates the rusting and corrosion normally accompanying the use of such devices filled with halogenated organic compounds per se.

Other objects and advantages of the present invention will become apparent to those skilled in the art as the description proceeds.

I have discovered that halogen decomposition products can be rendered substantially innocuous and the above objectives accomplished if, in accordance with the present invention, the halogenated organic materials to be protected are associated with a relatively small amount of diphenyl tin diethylate. This compound possesses the surprising property of inhibiting the deleterious action of hydrogen halides on metals and organic insulation materials without materially affecting the electrical properties of the halogenated compound or composition with which it is incorporated.

For a more complete understanding of the present invention, reference is made to the accompanying drawings and the experimental data hereinafter presented in the specific examples.

Figure 1 is a front elevation partly in section of a transformer; Figure 2 illlustrates a switch in a similar manner; Figure 3 represents a rolled capacitor; Figure 4 shows a sectional view of a portion of the electrodes and dielectric sheets of Figure 3; and Figure 5 is a side view of a cable, the casing being partly removed to permit the interior of the parts to be seen.

The transformer illustrated in Figure 1 comprises a casing 1, core 2, coils 3 insulated with manila paper, kraft paper, cotton or other fibrous insulation, insulating and cooling medium 4, lead-in bushings 5, and suitable leads 6 connected to the coil assembly. The insulating and cooling medium may consist of chlorinated biphenyl, trichlorbenzene and diphenyl tin diethylate in the following proportions:

| | Parts by weight |
|---|---|
| Chlorinated biphenyl (60% Cl) | 60 |
| Trichlorbenzene | 40 |
| Diphenyl tin diethylate | 0.1 |

Other well known liquid halogenated hydrocarbons or mixtures thereof may be used as the insulating and cooling liquid and various other halogenated organic compounds may constitute a part of such compositions, such as for example, halogenated compounds of naphthalene, toluene, benzene, nitro-diphenyl, diphenyl oxide, diphenyl ketone, diphenyl methane, diphenyl ethane, terphenyls, quaterphenyls, etc.

The presence of 0.05 to 0.1 part by weight of diphenyl tin diethylate in the cooling and insulating liquid will not only substantially reduce the deleterious effect of such liquid on organic insulation but will also greatly reduce the corrosion of the metal parts of the transformer which come in contact therewith in the presence or absence of air.

The switch shown in Figure 2 comprises a casing 6', fixed contacts 7 and 8, and movable contacts 9 and 10 which cooperate therewith. The movable contacts are mounted upon a support 11 which in turn is operatively connected to actuating levers 12. The following is illustrative of a suitable arc quenching liquid which may be used in this device, it being understood that the invention is not limited thereto.

| | Parts by weight |
|---|---|
| Chlorinated biphenyl (55% Cl) | 80 |
| Trichlorbenzene | 20 |
| Diphenyl tin diethylate | 0.05 |

In the operation of electric switches, the unavoidable arcing which accompanies make-and-break of the switch contacts results in partial decomposition of the chlorinated biphenyl or other halogenated organic compounds. The presence of diphenyl tin diethylate in the above liquid renders the halogen decomposition products innocuous with the result that switches provided therewith are substatially free from the corrosion normally accompanying the use of such devices filled with halogenated organic compounds per se.

The capacitor shown in Figure 3 is made up of alternate layers of metal foil such as aluminum or tin foil separated by sheets of dielectric material. It is produced by interleaving two dielectric sheets, such as linen or kraft paper, with the metal foil, and rolling the interleaved sheets in the conventional manner. The rolled capacitor is then impregnated with the dielectric composition by any suitable process, such as vacuum impregnation with chlorinated biphenyl having dissolved therein a small proportion of diphenyl tin diethylate. The capacitor is then placed in a protective case or otherwise used as desired.

The following range of compositions is illustrative of suitable capacitor impregnants:

COMPOSITION I

| | Percent by weight |
|---|---|
| Liquid chlorinated biphenyl, particularly chlorinated biphenyl containing from 42% to 60% by weight of chlorine | 0–100 |
| Conventional chlorinated organic dielectric materials | about 100–0 |
| Diphenyl tin diethylate | 0.01–1 |

COMPOSITION II

| | Parts by weight |
|---|---|
| Chlorinated biphenyl (42%–60% Cl) | 75 |
| Trichlorobenzene | 25 |
| Diphenyl tin diethylate | 0.1 |

Of the above range of compositions, the preferred capacitor impregnant is one having the following composition:

| | Parts by weight |
|---|---|
| Chlorinated biphenyl (55% Cl) | 75 |
| Trichlorbenzene | 25 |
| Diphenyl tin diethylate | 0.1 |

The presence of diphenyl tin diethylate in chlorinated biphenyl or other halogenated organic compounds provides excellent protection against the deleterious action of halogen decomposition products on metal, paper and other organic insulation material and consequently capacitors provided therewith will have a longer useful life and greater dielectric stability than similar capacitors containing halogenated organic compounds per se. Moreover, capacitors containing the above compound will not exhibit an ever increasing power factor with time when operated at high temperatures and voltages as is typical of capacitors impregnated with halogenated organic materials which are not associated with one of the above corrosion inhibitors.

Figure 4 shows a section of one turn of the finished rolled capacitor illustrating the alternate electrodes and dielectric layers. In accordance with the present invention, the finished capacitor contains a halogenated organic compound, preferably chlorinated biphenyl, and a minor proportion of diphenyl tin diethylate.

The cable of Figure 5 comprises a core 13, cable conductors 14, insulation consisting of paper or other suitable material 15 and a casing 16. The space between the insulated conductors and the casing is filled with a mixture of diphenyl tin diethylate and any of the liquid chlorinated organic compounds mentioned above. Such a composition may consist of a mixture of the following ingredients, but it is to be clearly understood that the invention is not restricted thereof.

| | Parts by weight |
|---|---|
| Chlorinated biphenyl (60% Cl) | 50 |
| Trichlorobenzene | 50 |
| Diphenyl tin diethylate | about 0.1 |

The experimental data hereinafter presented illustrate in a striking manner the scavenging or corrosion inhibiting action of diphenyl tin diethylate on dielectric compositions containing halogenated organic compounds. In accordance therewith, the effect of the corrosion inhibitor is brought out by showing and comparing the action of an HCl-saturated halogenated dielectric composition, with and without the inhibitor, on organic dielectric materials such as paper. The effectiveness of the inhibitor is manifested by the protection it affords paper against attack by hydrogen chloride and the degree of attack is indicated by the extent to which the tensile strength of the paper is decreased. This will be rendered more apparent by reference to the following examples.

Example I

Six strips of manila wrapping paper (6" x 1") were humidified at 65% R. H. at 70° F. for a period of 48 hours and subjected to tensile strength tests. These tests were run on a Scott IP-2 serigraph with a jaw separation of 3 inches and a rate of travel of 34.5 seconds for a load of 40 lbs. The result of these tests, being the average of 6 breaks, was as follows:

Tensile strength of paper samples__ 46.2 lbs./in.

Example II

Six strips of the same piece of manila wrapping paper (7" x 1") were allowed to soak at a temperature of 75° C. for 2½ hours in a solution consisting of 60 parts by weight of chlorinated biphenyl (60% Cl) and 40 parts by weight of trichlorbenzene saturated with HCl at 75° C. and 46 cm. Hg pressure, and at the end of this operation, the papers were soaked for 15 minutes in benzene, another 15 minutes in methanol and dried. After cutting one half inch from each end of the dried paper strips, they were subjected to the above tensile strength tests with the following results:

Tensile strength of impregnated paper samples _____ 11.5 lbs./in.

These examples demonstrate that HCl had a highly deleterious action on the samples since the tensile strength of the paper changed from 46.2 lbs./in. to 11.5 lbs./in., a decrease in tensile strength of approximately 75%.

Example III

The foregoing example was repeated using samples of the same paper and the same impregnant except that 0.1 part by weight of diphenyl tin diethylate was added. The tensile strength of the impregnated paper was found to be 28.0 lbs./in., thus demonstrating that the above compound is a highly effective material for rendering halogen decomposition products such as HCl innocuous to paper or other fibrous organic dielectrics.

The following table illustrates the electrical properties of the dielectric composition consisting of 60 parts by weight of chlorinated biphenyl (60% Cl) and 40 parts by weight of trichlorbenzene and also shows the effect thereon of adding about 0.1 part by weight of diphenyl tin diethylate.

|  | Dielectric Strength at 30° C. | Dielectric Constant at 1,000 Cycles at 100° C. | Volume Resistivity ohm cms. at 100° C. and 500 v. |
|---|---|---|---|
|  | Kv. |  |  |
| Chlorinated biphenyl (60% Cl), 60 parts by wt. Trichlorbenzene, 40 parts by wt. | 43 | 3.8 | 100×10$^9$ |
| Chlorinated biphenyl (60% Cl), 60 parts by wt. Trichlorbenzene, 40 parts by wt. Diphenyl tin diethylate, about 0.1 part by wt. | 49 | 3.86 | 980×10$^9$ |

The above experimental data indicate that diphenyl tin diethylate does not seriously affect, but actually improves, the electrical properties of the halogenated organic compounds associated therewith and that, therefore, such compositions are eminently suitable for use in transformers, capacitors, switches, cables and other electrical devices.

The description of the present invention has been directed primarily to compositions containing chlorinated biphenyl, trichlorobenzene and diphenyl tin diethylate, but it is to be understood that the invention is not restricted thereto but embraces halogenated organic compounds generally. Thus, the above compound may be used as a scavenger or corrosion inhibitor for chlorinated napthalene, chlorinated diphenyl ketone, chlorinated diphenyl oxide, chlorinated diphenyl methane, chlorinated diphenyl ethane, chlorinated benzene, chlorinated toluene, chorinated nitro diphenyl, chlorinated alkylated benzenes, chlorinated alkylated biphenyls, ethyl trichlorbenzene, ethyl tetrachlorbenzene, ethyl pentachlorbenzene, chlorinated terphenyls, chlorinated quaterphenyls, chlorinated paraffinic hydrocarbons, chlorinated alicyclic hydrocarbons, chlorinated oxygen-containing organic compounds, chlorinated rubber, chlorbutadiene polymers, chlorinated fats, chlorinated vegetable oils, chlorinated animal oils, chlorinated mineral oils or mixtures of two or more of these. In place of the chlorinated compounds, the corresponding fluorine, bromine and iodine derivatives may be used. In fact, any halogenated organic compound or composition which tends by reason of its halogen content to cause corrosion of metals or dehydration of paper or organic fibrous insulation, may be rendered substantially innocuous by means of diphenyl tin diethylate.

The method of incorporating diphenyl tin diethylate varies with the halogenated organic compound or composition. If the halogenated compound or composition is liquid at room temperature, the above compound is merely dissolved therein in suitable concentrations; if it is a solid, the diphenyl tin diethylate is blended therewith by the use of solvents or swelling agents or by means of mixing rolls, etc. In the case of halogenated polymers, the foregoing compound may be incorporated before, during or after polymerization of the corresponding monomers.

The quantity of diphenyl tin diethylate used varies with the halogenated organic compound or composition. In general, satisfactory results are obtained by employing this compound in an amount varying from 0.05% to 1% and preferably from 0.05% to 0.1% by weight of the halogenated organic compound or composition, but it is to be understood that the invention is not limited thereto as slightly lower and somewhat higher concentrations may be employed. Stated broadly, the above compound may be used in amounts varying from 0.01% by weight up to and above the limit of its solubility in the halogenated organic compound or composition. In most instances, it is desirable not to exceed the solubility limits of the diphenyl tin diethylate, but there are some applications such as heat exchanging operations in which this may be done without harmful effects.

As widely different embodiments of this invention may be made without departing from the spirit thereof, it is to be understood that the invention is not limited to the specific embodiments except as defined in the appended claims.

I claim:

1. A composition of matter consisting essentially of a halogenated aromatic compound and as a scavenger therefor a sufficient amount of diphenyl tin diethylate to render the decomposition products of said halogenated compound substantially innocuous.

2. A composition of matter consisting essentially of a chlorinated aromatic compound and as a scavenger therefor diphenyl tin diethylate in an amount varying from about 0.01% to about 0.1% by weight.

3. A heat transfer and dielectric composition consisting essentially of chlorinated biphenyl and as a scavenger therefor about 0.01% to about 1% by weight of diphenyl tin diethylate.

4. An insulating and cooling medium for electric apparatus consisting essentially of a liquid chlorinated biphenyl and about 0.05% to about 1% by weight of diphenyl tin diethylate, said chlorinated biphenyl containing from 42% to 60% by weight of chlorine.

5. A dielectric composition consisting essentially of chlorinated biphenyl and about 0.1% by weight of diphenyl tin diethylate.

6. An insulating and cooling composition for electrical apparatus consisting essentially of a liquid chlorinated biphenyl and about 0.05% to about 0.1% by weight of diphenyl tin diethylate.

7. An insulating and cooling composition for electrical apparatus consisting of about 60% by weight of chlorinated biphenyl, about 40% by weight of trichlorbenzene and about 0.1% by weight of diphenyl tin diethylate.

8. An electric arc quenching composition consisting of about 80% by weight of chlorinated biphenyl, about 20% by weight of trichlorbenzene and about 0.05% by weight of diphenyl tin diethylate.

9. An electric arc quenching composition consisting of about 50% by weight of chlorinated biphenyl, about 50% by weight of trichlorbenzene and about 0.1% by weight of diphenyl tin diethylate, said chlorinated biphenyl containing 60% by weight of chlorine.

10. A capacitor impregnant consisting essentially of the following components in the indicated proportions to make 100% by weight.

| | Percent |
|---|---|
| Chlorinated biphenyl containing from 42% to 60% by weight of chlorine | 0–about 100 |
| Chlorinated aromatic compounds other than chlorinated biphenyl | about 100–0 |
| Diphenyl tin diethylate | 0.01–1 |

11. A capacitor impregnant consisting of about 75% by weight of chlorinated biphenyl (42%–60% Cl) about 25% by weight of trichlorbenzene and about 0.1% by weight of diphenyl tin diethylate.

RUSSELL L. JENKINS.

References Cited in the file of this patent

UNITED STATES PATENTS

| Number | Name | Date |
|---|---|---|
| 2,041,594 | Clark | May 19, 1936 |
| 2,334,566 | Lincoln | Nov. 16, 1943 |
| 2,468,544 | Clark | Apr. 26, 1949 |
| 2,481,086 | Cleverdon | Sept. 6, 1949 |
| 2,489,518 | Burt | Nov. 29, 1949 |
| 2,513,632 | Fawcett | July 4, 1950 |